(12) United States Patent
Conner

(10) Patent No.: US 7,890,686 B2
(45) Date of Patent: Feb. 15, 2011

(54) DYNAMIC PRIORITY CONFLICT RESOLUTION IN A MULTI-PROCESSOR COMPUTER SYSTEM HAVING SHARED RESOURCES

(75) Inventor: Bryan Conner, Calhan, CO (US)

(73) Assignee: SRC Computers, Inc., Colorado Springs, CO (US)

(*) Notice: Subject to any disclaimer, the term of this patent is extended or adjusted under 35 U.S.C. 154(b) by 1180 days.

(21) Appl. No.: 11/252,341

(22) Filed: Oct. 17, 2005

(65) Prior Publication Data

US 2007/0088886 A1 Apr. 19, 2007

(51) Int. Cl.
G06F 13/14 (2006.01)
(52) U.S. Cl. ..................................................... 710/244
(58) Field of Classification Search ......... 710/113–125, 710/240–244
See application file for complete search history.

(56) References Cited

U.S. PATENT DOCUMENTS

| | | | |
|---|---|---|---|
| 4,663,756 A | 5/1987 | Retterath | |
| 4,763,294 A | 8/1988 | Fong | |
| 4,920,486 A | 4/1990 | Nielsen | |
| 4,953,081 A | 8/1990 | Feal et al. | |
| 5,016,162 A * | 5/1991 | Epstein et al. | 710/242 |
| 5,230,057 A | 7/1993 | Shido et al. | |
| 5,392,436 A | 2/1995 | Jansen et al. | |
| 5,509,134 A | 4/1996 | Fandrich et al. | |
| 5,553,248 A | 9/1996 | Melo et al. | |
| 5,570,040 A | 10/1996 | Lytle et al. | |
| 5,623,672 A | 4/1997 | Popat | |
| 5,692,136 A * | 11/1997 | Date et al. | 710/107 |
| 5,737,766 A | 4/1998 | Tan | |

(Continued)

FOREIGN PATENT DOCUMENTS

EP  0 284 094 A2  9/1988

(Continued)

OTHER PUBLICATIONS

Microsoft Press Computer Dictionary, second edition, Definition of Round Robin. 1994.*

(Continued)

*Primary Examiner*—Paul R Myers
(74) *Attorney, Agent, or Firm*—William J. Kubida; Hogan Lovells US LLP

(57) ABSTRACT

A system and method for fair dynamic priority conflict resolution in a multi-processor computer system having shared resources wherein each multi-processor seeking access to said shared resource possesses a common priority level. In the occurrence of a priority tie or when a single port is active, a typical dynamic conflict resolution scheme is altered to ensure fair resolution of the conflict or tie. Upon determination that a priority conflict tie exists, one of the processor elements is selected based on a predetermined priority level. The identity of the selected processor element and the configuration of the conflict priority tie is stored. Upon a subsequent conflict priority tie having the same configuration as a previous priority conflict tie, the processor elements selected in previous ties are prevented from being selected in subsequent priority conflict ties until all of the processor elements in a particular priority tie configuration have been selected. In situations involving a single active port, established dynamic conflict resolution schemes are modified to provide fair access and reduce priority tie conflicts.

17 Claims, 6 Drawing Sheets

U.S. PATENT DOCUMENTS

| | | | |
|---|---|---|---|
| 5,748,969 A | 5/1998 | Lee et al. | |
| 5,802,290 A | 9/1998 | Casselman | |
| 5,842,025 A | 11/1998 | Joffe | |
| 5,892,962 A | 4/1999 | Cloutier | |
| 5,903,771 A | 5/1999 | Sgro et al. | |
| 5,953,502 A | 9/1999 | Helbig, Sr. | |
| 5,966,534 A | 10/1999 | Cooke et al. | |
| 6,023,755 A | 2/2000 | Casselman | |
| 6,026,459 A | 2/2000 | Huppenthal | |
| 6,052,773 A | 4/2000 | DeHon et al. | |
| 6,076,152 A | 6/2000 | Huppenthal et al. | |
| 6,192,439 B1 | 2/2001 | Grunewald et al. | |
| 6,704,816 B1 | 3/2004 | Burke | |
| 6,721,884 B1 | 4/2004 | De Oliveira Kastrup Pereira et al. | |
| 7,051,133 B2 * | 5/2006 | Takata | 710/111 |
| 7,120,714 B2 * | 10/2006 | O'Connor et al. | 710/243 |
| 7,162,557 B2 * | 1/2007 | Takeda et al. | 710/240 |
| 2004/0081093 A1 * | 4/2004 | Haddock et al. | 370/230 |
| 2004/0193767 A1 | 9/2004 | Drerup et al. | |
| 2005/0053057 A1 * | 3/2005 | Deneroff et al. | 370/360 |
| 2005/0223147 A1 * | 10/2005 | Hellwig et al. | 710/110 |

FOREIGN PATENT DOCUMENTS

| | | |
|---|---|---|
| EP | 0 284 094 A3 | 9/1988 |

OTHER PUBLICATIONS

IEEE 100 The Authoritive Dictionary of IEEE Standards Terms, seventh edition, Definition of Round Robin 2000.*

IEEE 100 The Authoritative Dictionary of IEEE tandards Terms Seventh edition copyright 2000 Definition of Round Robin and Pointer.*

Agarwal, A., et al., "The Raw Compiler Project", pp. 1-12, http://cag-www.lcs.mit.edu/raw, Proceedings of the Second SUIF Compiler Workshop, Aug. 21-23, 1997.

Albaharna, Osama, et al., "On the viability of FPGA-based integrated coprocessors", © 1996 IEEE, Publ. No. 0-8186-7548-9/96, pp. 206-215.

Amerson, Rick, et al., "Teramac—Configurable Custom Computing", © 1995 IEEE, Publ. No. 0-8186-7086-X/95, pp. 32-38.

Barthel, Dominique Aug. 25-26, 1997, "PVP a Parallel Video coProcessor", Hot Chips IX, pp. 203-210.

Bertin, Patrice, et al., "Programmable active memories: a performance assessment", © 1993 Massachusetts Institute of Technology, pp. 88-102.

Bittner, Ray, et al., "Computing kernels implemented with a wormhole RTR CCM", © 1997 IEEE, Publ. No. 0-8186-8159-4/97, pp. 98-105.

Buell, D., et al. "Splash 2: FPGAs in a Custom Computing Machine—Chapter 1—Custom Computing Machines: An Introduction", pp. 1-11, http://www.computer.org/espress/catalog/bp07413/spls-ch1.html (originally believed published in J. of Supercomputing, vol. IX, 1995, pp. 219-230.

Casselman, Steven, "Virtual Computing and the Virtual Computer", © 1993 IEEE, Publ. No. 0-8186-3890-7/93, pp. 43-48.

Chan, Pak, et al., "Architectural tradeoffs in field-programmable-device-based computing systems", © 1993 IEEE, Publ. No. 0-8186-3890-7/93, pp. 152-161.

Clark, David, et al., "Supporting FPGA microprocessors through retargetable software tools", © 1996 IEEE, Publ. No. 0-8186-7548-9/96, pp. 195-103.

Cuccaro, Steven, et al., "The CM-2X: a hybrid CM-2/Xilink prototype", © 1993 IEEE, Publ. No. 0-8186-3890-7/93, pp. 121-130.

Culbertson, W. Bruce, et al., "Exploring architectures for volume visualization on the Teramac custom computer", © 1996 IEEE, Publ. No. 0-8186-7548-9/96, pp. 80-88.

Culbertson, W. Bruce, et al., "Defect tolerance on the Teramac custom computer", © 1997 IEEE, Publ. No. 0-8186-8159-4/97, pp. 116-123.

Dehon, Andre, "DPGA-Coupled microprocessors: commodity IC for the early $21^{st}$ century", © 1994 IEEE, Publ. No. 0-8186-5490-2/94, pp. 31-39.

Dehon, A., et al., "Matrix A Reconfigurable Computing Device with Configurable Instruction Distribution", Hot Chips IX, Aug. 25-26, 1997, Stanford, California, MIT Artificial Intelligence Laboratory.

Dhaussy, Philippe, et al., "Global control synthesis for an MIMD/FPGA machine", © 1994 IEEE, Publ. No. 0-8186-5490-2/94, pp. 72-81.

Elliott, Duncan, et al., "Computational Ram: a memory-SIMD hybrid and its application to DSP", ©1992 IEEE, Publ. No. 0-7803-0246-X/92, pp. 30.6.1-30.6.4.

Fortes, Jose, et al., "Systolic arrays, a survey of seven projects", © 1987 IEEE, Publ. No. 0018-9162/87/0700-0091, pp. 91-103.

Gokhale, M., et al., "Processing in Memory: The Terasys Massively Parallel PIM Array" © Apr. 1995, IEEE, pp. 23-31.

Gunther, Bernard, et al., "Assessing Document Relevance with Run-Time Reconfigurable Machines", © 1996 IEEE, Publ. No. 0-8186-7548-9/96, pp. 10-17.

Hagiwara, Hiroshi, et al., "A dynamically microprogrammable computer with low-level parallelism", © 1980 IEEE, Publ. No. 0018-9340/80/07000-0577, pp. 577-594.

Hartenstein, R. W., et al. "A General Approach in System Design Integrating Reconfigurable Accelerators," http://xputers.informatik.uni-kl.de/papers/paper026-1.html, IEEE 1996 Conference, Austin, TX, Oct. 9-11, 1996.

Hartenstein, Reiner, et al., "A reconfigurable data-driven ALU for Xputers", © 1994 IEEE, Publ. No. 0-8186-5490-2/94, pp. 139-146.

Hauser, John, et al.: "GARP: a MIPS processor with a reconfigurable co-processor", © 1997 IEEE, Publ. No. 0-08186-8159-4/97, pp. 12-21.

Hayes, John, et al., "A microprocessor-based hypercube, supercomputer", © 1986 IEEE, Publ. No. 0272-1732/86/1000-0006, pp. 6-17.

Herpel, H. J., et al., "A Reconfigurable Computer for Embedded Control Applications", © 1993 IEEE, Publ. No. 0-8186-3890-7/93, pp. 111-120.

Hogl, H., et al., "Enable++: A second generation FPGA processor", © 1995 IEEE, Publ. No. 0-8186-7086-X/95, pp. 45-53.

King, William, et al., "Using MORRPH in an Industrial machine vision system". © 1996 IEEE, Publ. No. 08186-7548-9/96, pp. 18-26.

Manohar, Swaminathan, et al., "A pragmatic approach to systolic design", ©1988 IEEE, Publ. No. CH2603-9/88/0000/0463, pp. 463-472.

Mauduit, Nicolas, et al., "Lneuro 1.0: a piece of hardware LEGO for building neural network systems," © 1992 IEEE, Publ. No. 1045-9227/92, pp. 414-422.

Mirsky, Ethan A., "Coarse-Grain Reconfigurable Computing", Massachusetts Institute of Technology, Jun. 1996.

Mirsky, Ethan, et al., "MATRIX: A Reconfigurable Computing Architecture with Configurable Instruction Distribution and Deployable Resources", © 1996 IEEE, Publ. No. 0-8186-7548-9/96, pp. 157-166.

Morley, Robert E., Jr., et al., "A Massively Parallel Systolic Array Processor System", © 1988 IEEE, Publ. No. CH2603-9/88/0000/0217, pp. 217-225.

Patterson, David, et al., "A case for intelligent DRAM: IRAM", Hot Chips VIII, Aug. 19-20, 1996, pp. 75-94.

Peterson, Janes, et al., "Scheduling and partitioning ANSI-C programs onto multi-FPGA CCM architectures", © 1996 IEEE, Publ. No. 0-8186-7548-9/96, pp. 178-187.

Schmit, Herman, "Incremental reconfiguration for pipelined applications," © 1997 IEEE, Publ. No. 0-8186-8159-4/97, pp. 47-55.

Sitkoff, Nathan, et al., "Implementing a Genetic Algorithm on a Parallel Custom Computing Machine", Publ. No. 0-8186-7086-X/95, pp. 180-187.

Stone, Harold, "A logic-in-memory computer", © 1970 IEEE, IEEE Transactions on Computers, pp. 73-78, Jan. 1990.

Tangen, Uwe, et al., "A parallel hardware evolvable computer POLYP extended abstract", © 1997 IEEE, Publ. No. 0-8186-8159/4/97, pp. 238-239.

Thornburg, Mike, et al., "Transformable Computers", © 1994 IEEE, Publ. No. 0-8186-5602-6/94, pp. 674-679.

Tomita, Shinji, et al., "A computer low-level parallelism QA-2", © 1986 IEEE, Publ. No. 0-0384-7495/86/0000/0280, pp. 280-289.

Trimberger, Steve, et al., "A time-multiplexed FPGA", © 1997 IEEE, Publ. No. 0-8186-8159-4/97, pp. 22-28.

Ueda, Hirotada, et al., "A multiprocessor system utilizing enhanced DSP's for image processing", © 1988 IEEE, Publ. No. CH2603-9/88/0000/0611, pp. 611-620.

Villasenor, John, et al., "Configurable computing", © 1997 Scientific American, Jun. 1997.

Wang, Quiang, et al., "Automated field-programmable compute accelerator design using partial evaluation", © 1997 IEEE, Publ. No. 0-8186-8159-4/97, pp. 145-154.

W.H. Mangione-Smith and B.L. Hutchings. Configurable computing: The Road Ahead. In Proceedings of the Reconfigurable Architectures Workshop (RAW'97), pp. 81-96, 1997.

Wirthlin, Michael, et al., "The Nano processor: a low resource reconfigurable processor", © 1994 IEEE, Publ. No. 0-8186-5490-2/94, pp. 23-30.

Wirthlin, Michael, et al., "A dynamic instruction set computer", © 1995 IEEE, Publ. No. 0-8186-7086-X/95, pp. 99-107.

Wittig, Ralph, et al., "One Chip: An FPGA processor with reconfigurable logic", © 1996 IEEE, Publ. No. 0-8186-7548-9/96, pp. 126-135.

Yamauchi, Tsukasa, et al., "SOP: A reconfigurable massively parallel system and its control-data flow based compiling method", © 1996 IEEE, Publ. No. 0-8186-7548-9/96, pp. 148-156.

"Information Brief", PCI Bus Technology, © IBM Personal Computer Company, 1997, pp. 1-3.

Yun, Hyun-Kyu and Silverman, H. F.; "A distributed memory MIMD multi-computer with reconfigurable custom computing capabilities", Brown University, Dec. 10-13, 1997, pp. 7-13.

Vemuri, Ranga R. et al., "Configurable Computing: Technology and Applications", Apr. 2000, Computer, pp. 39-40.

DeHon, Andre, "The Density Advantage of Configurable Computing", Apr. 2000, Computer, pp. 41-49.

Haynes, Simon D. et al., "Video Image Processing with the Sonic Architecture", Apr. 2000, Computer, pp. 50-57.

Platzner, Marco, "Reconfigurable Accelerators for Combinatorial Problems", Apr. 2000, Computer, pp. 58-60.

Callahan, Timothy J. et al., "The Garp Architecture and C Compiler", Apr. 2000, Computer, pp. 62-69.

Goldstein, Seth Copen et al., "PipeRench: A Reconfigurable Architecture and Compiler", Apr. 2000, Computer, pp. 70-76.

Chen, Min-Ih, et al., "A Priority Ceiling Protocol for Multiple-Instance Resources", Proceedings of the Real Time Systems Symposium, San Antonio, TX, Dec. 4-6, 1991, IEEE Comp, Soc. Press, US, vol. Symp. 12, XP010026203, Dec. 4, 1991.

European Search report for 06816741.0-1229 / 1952250, date Sep. 2, 2009, pp. 6.

* cited by examiner

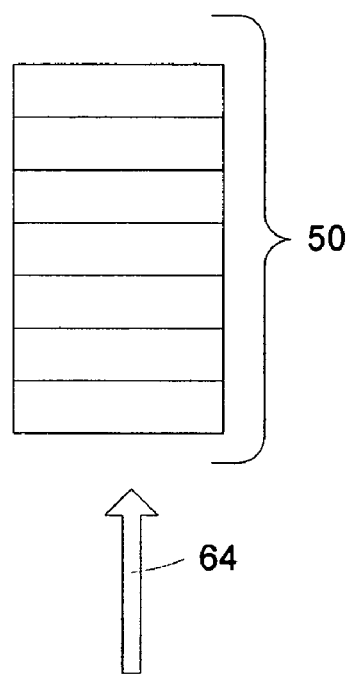
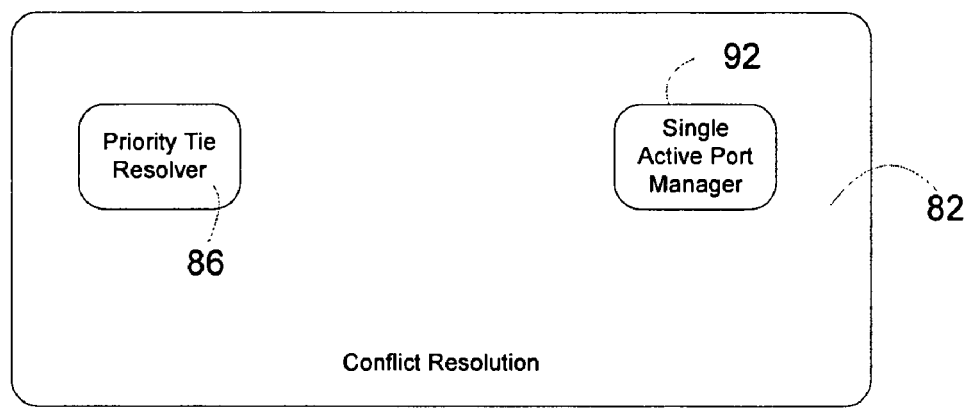
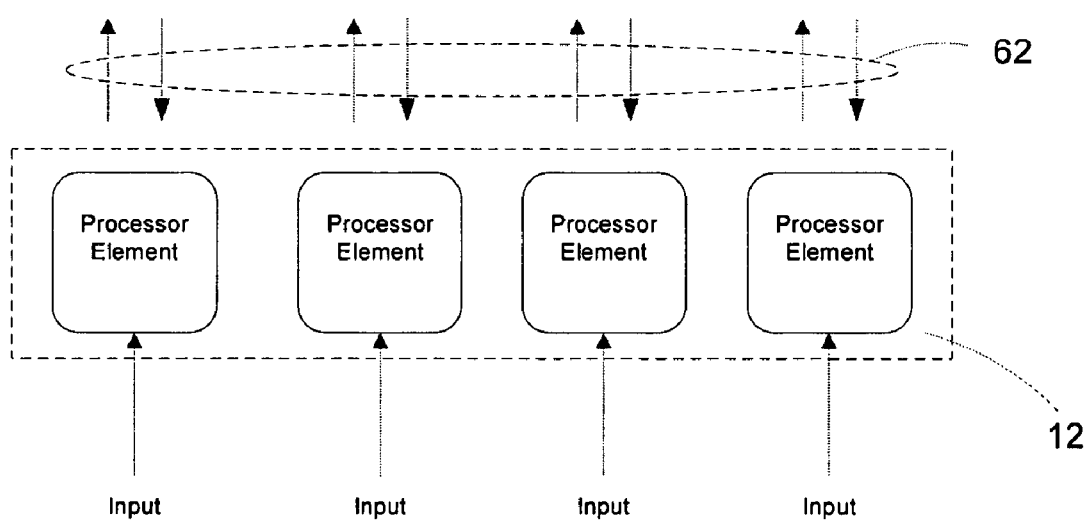
Figure 4

DYNAMIC PRIORITY CONFLICT RESOLUTION IN A MULTI-PROCESSOR COMPUTER SYSTEM HAVING SHARED RESOURCES

RELATED APPLICATIONS

The present invention is related to the subject matter disclosed in U.S. Pat. No. 6,026,459 issued Feb. 15, 2000 for System and Method for Dynamic Priority Conflict Resolution in a Multi-Processor Computer System Having Shared Memory Resources," and U.S. Pat. No. 6,076,152 issued Jun. 13, 2000 for "Multiprocessor Computer Architecture Incorporating a Plurality of Memory Algorithm Processors in the Memory Subsystem" assigned to SRC Computers, Inc., Colorado Springs, Colo., assignee of the present invention, the disclosures of which are herein specifically incorporated by this reference.

BACKGROUND OF THE INVENTION

1. Field of the Invention

The present invention relates, in general, to software, systems and methods for dynamic priority conflict resolution in multiprocessor computer systems and more particularly to conflict resolution in multiprocessor computer systems having shared memory with equal priority values.

2. Relevant Background

Symmetric Multi-Processing ("SMP") is defined as the connection of more than one homogeneous processor to a single, monolithic central memory. However, until recently, hardware and software limitations have minimized the total number of physical processors that could access a single memory efficiently. These limitations have reduced the ability to maintain computational efficiency as the number of processors in a computer system increased, thus reducing the overall scalability of the system. With the advent of faster and ever more inexpensive microprocessors, large processor count SMP systems are becoming available and hardware advances have allowed interconnected networks to multiplex hundreds of processors to a single memory with a minimal decrease in efficiency.

Nevertheless, in any computer system that employs multiple processors which share the same memory space, it is possible that at least two processors may try to access the same memory simultaneously. In this instance a "conflict" is said to exist. In addition to memory, conflicts may also arise for any single element in the system wherein multiple users may require substantially concurrent access. An example of this type of conflict might occur when a port on a crossbar switch is used to route incoming signals from multiple ports to a selected output port; also a situation requiring conflict resolution. To resolve such conflicts, special circuitry must be added to the computer system in order to determine which device is allowed to access memory or another system resource at any given time.

The simplest of these circuits merely assigns a predetermined priority value to each of the processors in the system. when a conflict occurs, the circuit grants access to the highest priority processor. Any other processor must try to access memory at a later time, which causes it to be delayed. Although this circuit is easy to implement, it has several major drawbacks. First, it is possible for a single, high-priority processor to continually access the resource and prevent lower priority processors from ever getting access to it. This event will stall out the other processors and greatly reduce system performance. Secondly, as the number of processors increase, so will the likelihood of an unfair access event happening. As a result, it has been very difficult to build shared memory computers with hundreds of processors and still have the performance of that system scale well beyond 64 processors.

One solution to resolving conflicts between multiple processors attempting to access the same memory is disclosed in U.S. Pat. No. 6,026,459 ("the '459 patent"), assigned to SRC Computers, Inc. of Colorado Springs, Colo. The system and method disclosed in the '459 patent advantageously overcomes this memory access priority problem and is of especial utility in affording equal priority access to the shared memory resources by all processing devices.

The functionality of the system disclosed in the '459 patent is to resolve conflicts within a crossbar switch used to connect the processors to the shared memory in a computer system. In a computer system utilizing a relatively large number of processors, it is necessary to ensure that all processors have equal priority to access memory over time. In operation, a priority level for each input port is maintained by each output port. On power up, these priority levels are predetermined in accordance with the particular computer system design. When a conflict for a particular output port occurs, the priority levels of the conflicting inputs are evaluated and access is initially granted to the highest priority input. Once this initial access is granted, the priority level of the "winning" input is then changed to the lowest priority level and the priority of all of the other inputs is increased by one.

Through use of this technique, all inputs will transition through all of the possible priority levels based upon their usage of the output and an input that has just been given access to the output will have a low priority, whereas an input that has not recently accessed the output will have a higher priority. Inasmuch as only those inputs that require access to the output are evaluated, the system as disclosed in the '459 patent always allows a useful connection. In addition, the input that has least recently used the output will be allowed access to it.

But since it is possible that an input may not need access to a particular output port for some time, its priority will over time be incremented to the highest level, where it will remain. This incremental advancement to the highest priority level may occur for more than one port as the highest level priority is the only priority level that can legitimately be held by more than one input at a time. As a consequence, a mechanism is needed to deal with a conflict between inputs that all have the highest priority level. This priority level tie might also be encountered in the event of a circuit error that inappropriately assigned the same priority to two differing inputs.

One solution disclosed in U.S. Pat. No. 6,026,459 to resolve ties of this natures is to default back to the original predetermined priorities when a priority conflict occurs. This action breaks the tie and allows the circuit to continue to function but may create unfair access patterns when many similar ties occur over time. While this approach guarantees that no input will be blocked indefinitely and that the longest wait for any input will be equal to the time duration for which access is granted, multiplied by the total number of inputs it results in the same winner being chosen if repeated ties occur. What is needed are methods and systems that can fairly resolve conflicts between inputs that simultaneously possess the highest priority level.

A second fairness concern in implementation of techniques such as the one disclosed in the '459 patent is a recurring processor selection phenomena with respect to semaphore access. In multitasking systems, a semaphore is a variable with a value that indicates the status of a common resource.

It's used to lock the resource that is being used. A process needing the resource checks the semaphore to determine the resource's status and then decides how to proceed. If a processor seeking a particular semaphore finds it locked it must wait until the semaphore once again becomes available. Current system provide unfair access to such semaphores. In a typically scenario two or more processors will simultaneously seek access to the same semaphore. Based on schemes such as described in the '459 patent a conflict in access to the semaphore will be resolved by a priority comparison. Such a priority comparison will result in a reoccurring pattern of selection that is skewed. What is needed are method and systems that can fairly resolve conflicts between inputs seeking access to a semaphore.

SUMMARY OF THE INVENTION

The system and method of the present invention advantageously overcomes these conflict problems and affords a fair and efficient resolution to memory access. In a particular embodiment disclosed herein a circuit stores the identity of a winner in the event of a priority tie and prevents the same winner selection on subsequent ties until all ports in the priority tie have been used. Once all the ports have been used the process begins anew. Specifically, ports to be issued a win during a tie are stored by the system. The next time a tie occurs under the same circumstances a new port, different from the previous winner, is issued a win until all ports have been used. Once all of the ports originally tied have been allowed to win, the process starts over. This new process for dealing with ties prevents a memory access circuit from always defaulting to the same port for ties of the highest priority.

Specifically, what has been disclosed herein is a computer system including a plurality of processing elements requiring access to a shared memory resource. The computer system comprises a priority conflict resolution circuit including a priority tie resolver for controlling access to the memory resource among the processing elements. The priority conflict resolution circuit includes a predetermined differing initial priority assigned corresponding to each of the plurality of the processing elements. Typically, upon a selected one of the processing elements being afforded access to the memory resource based upon its initial priority being a highest priority, the initial priority of that processing element is then changed to a lowest priority and the priority of all others of the plurality of the processing elements is incremented to a next higher priority. In the event that a tie occurs between the priority assigned to two or more processing elements, (the two or more processing elements having the highest priority) an initial winner is selected based on preset criteria. This winners' identity is stored so that should the same tie configuration occur again the initial winner will be prevented from winning until all of the other tied processing elements having the same highest priority possess the same wining statistics. Once all of the processing elements have equal winning statistics, the process repeats.

Also disclosed herein is a method for dynamic priority conflict resolution in a computer system having a plurality of processing elements and a shared memory resource in which only one input port is active. Typically priority conflict resolution is accomplished by the steps of assigning a predetermined differing initial priority corresponding to each of the plurality of processing elements; affording access to the memory resource to a requesting one of the processing elements having a highest initial priority thereof and incrementing the priority of the remaining processing elements to a next higher priority. In one embodiment of the invention disclosed herein, when only one port is active, the priority of that port remains the same for at least one selection cycle.

Disclosed herein is a system and method for resolving serial packet conflicts that occur when a single switch in a multiprocessor computer system is confronted with multiple access requests simultaneously. Switches in a layered crossbar switch configuration are chained together to form a toroidal switch. Packets of inferior priority initially serialized can be rerouted to switches offering access to the shared resource.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 4 is a functional block diagram of a conflict resolution circuit for use in conjunction with the system and method of the present invention

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
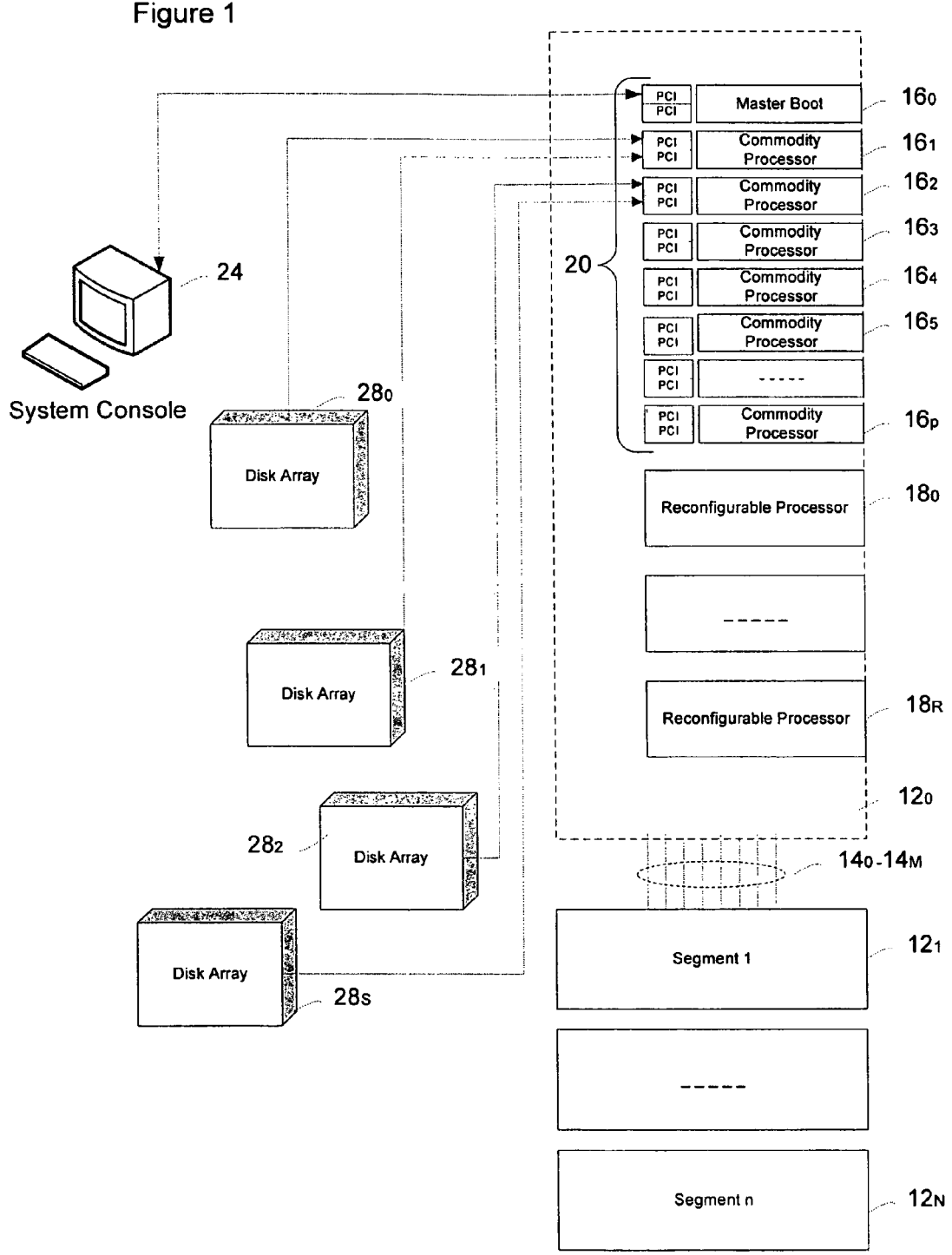
FIG. 1 are a functional block system overview illustrating a computer system in accordance with an embodiment of the present invention comprising between 1 and 16 segments coupled together by a like number of trunk lines, each segment containing a number of reconfigurable and commodity processors in addition to memory and a crossbar switch assembly.

FIG. 1 illustrates a high level overview of a symmetric multi-processing computer system 10 in accordance with some embodiments of the present invention. The exemplary computer system 10 comprises, in pertinent part, any number of interconnected segments $12_0$ through $12_n$, although the principles of the present invention are likewise applicable to any scalable system having large numbers of processors. The various segments $12_0$ through $12_n$ are coupled through a number of trunk lines $14_0$ through $14_m$ as will be more fully described hereinafter.

Each of the segments 12 comprises a number of functionally differentiated processing elements in the form of commodity processors $16_0$ through $16_p$ (commodity processor $16_0$ functions additionally as a master boot device) and reconfigurable processors $18_0$ through $18_r$. The commodity processors 16 are coupled to a number of peripheral component interconnect ("PCI") interface modules 20, and in the embodiment shown, each commodity processor is coupled to two such modules 20 to enable the commodity processors 16 to carry out all of the I/O functionality of the segment 12.

The computer system 10 further includes a serial-to-PCI interface for coupling a system console 24 to at least one of the segments 12 of the computer system 10. The system console 24 is operational for enabling a user of the computer system 10 to download boot information to the computer system 10, configure devices, monitor status, and perform diagnostic functions. Regardless of how many segments 12 are configured in the computer system 10, only one system console 24 is required.

A boot device may also be coupled to the master boot commodity processor $16_0$ through one of the PCI modules 20. The PCI modules 20 coupled to commodity processors $16_1$ through $16_p$ are utilized to couple the segment 12 to all other peripheral devices such as, for example, disk arrays $28_0$ through $28_s$, any one or more of which may be replaced by, for example, an Ethernet connection.

The computer system 10 comprises sophisticated hardware and building blocks which are commodity based, with some enhancements to accommodate the uniqueness of high-performance computing ("HPC"). On the hardware side, the base unit for the computer system 10 is a segment 12. Each segment 12 contains reconfigurable and commodity processors 18, elements, memory, power supplies, and a crossbar switch assembly. The computer system 10 is "scalable" in that an end user can configure a system that consists of interconnected segments 12. Each segment 12 contains several processors designated as either reconfigurable processors or commodity processors 16. A typical configuration of a segment may be four commodity processors 16 and sixteen reconfigurable processors 18. In a preferred embodiment, the reconfigurable processors 18 may reside on an individual assembly that contains four processors (e.g. the Deschutes™ microprocessor available from Intel Corporation, Santa Clara, Calif.) and eight interface chips (i.e. two per reconfigurable processor 18). Each reconfigurable processor 18 has an internal processor clock rate greater than 300 MHz and a system clock speed greater than 100 MHz, and the interface chips provide the connection between the reconfigurable processors 18 and the memory switches that connect to memory as will be described and shown in greater detail hereafter.

The commodity processors 16 may be contained on a commodity processor assembly, which is responsible for all input and output for the computer system 10. Each of the commodity processor assemblies contain a processor (the same type as the reconfigurable processor 18), two interface chips, two I/O buffers, and two bi-directional PCI buses. Each PCI bus has a single connector. All I/O ports have DMA capability with equal priority to processors. The PCI modules 20 serve dual purposes, depending upon which commodity processor 16 with which they are used. The PCI connectors on the master boot commodity processor $16_0$ are used to connect to the boot device 26 and the system console 24. The PCI modules 20 on the regular commodity processors $16_1$ through $16_p$ are used for all other peripherals. Some of the supported PCI-based interconnects include small computer systems interface ("SCSI"), fiber distributed data interface ("FDDI"), high performance parallel interface ("HIPPI") and others. Each PCI bus has a corresponding commodity-based host adapter.

The separation of commodity functions from computing functions allows for concurrent execution of numeric processing and the servicing of operating system duties and external peripherals.

Figure 2:
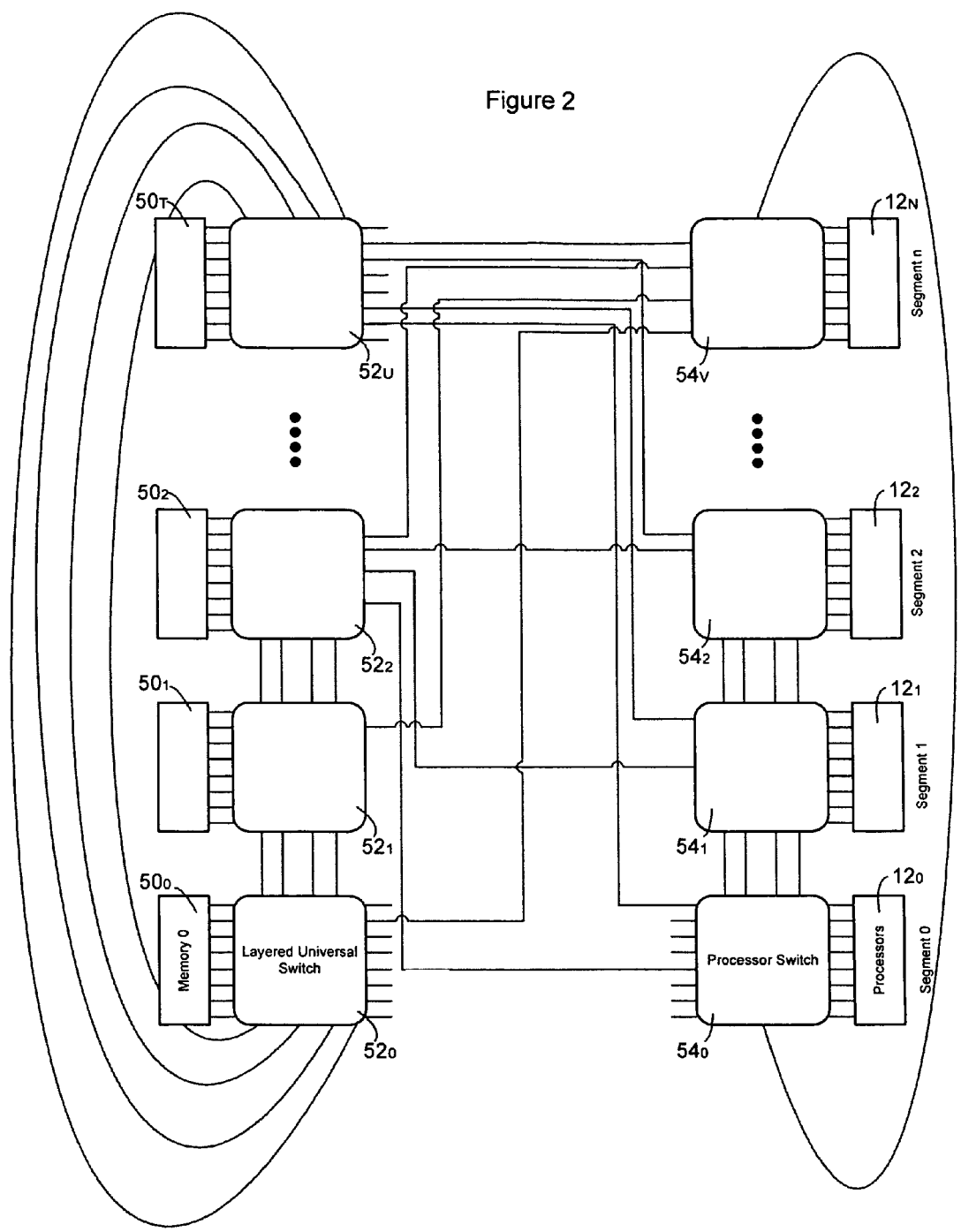
FIG. 2 is a simplified functional block diagram for the interconnect strategy for the computer system of FIG. 1.

With reference additionally now to FIG. 2, the interconnect strategy for the computer system 10 of FIG. 1 is shown in greater detail in an implementation employing n segments $12_0$ through $12_n$ interconnected by means of m trunk lines $14_0$ through $14_m$. As shown, a number of memory banks $50_0$ through $50_t$, each allocated to a respective one of the reconfigurable processors $18_0$ through $18_r$ (resulting in t memory banks 50 per segment 12 for a n segment 12 computer system 10) form a portion of the computer system 10 and are respectively coupled to the trunk lines $14_0$ through $14_m$ through a like number of memory switches $52_0$ through $52_u$. The memory utilized in the memory banks $50_0$ through $50_t$ may be synchronous static random access memory ("SSRAM") or other suitable high speed memory devices. Also as shown, each of the segments $12_0$ through $12_n$ includes, for example, eight processors (three commodity processors $16_0$ through $16_2$ and five reconfigurable processors $18_0$ through $18_4$) coupled to the trunk lines $14_0$ through $14_m$ through a corresponding one of a like number of processor switches $54_0$ through $54_v$.

Each segment 12 interconnects to all other segments 12 through the crossbar switch. The computer system 10 crossbar switch technology enables segments 12 to have uniform memory access times across segment boundaries, as well as within the individual segment 12. It also enables the computer system 10 to employ a single memory access protocol for all the memory in the system. The crossbar switch may utilize high-speed Field Programmable Gate Arrays ("FPGAs")to provide interconnect paths between memory and the processors, regardless of where the processors and memory are physically located. This crossbar switch interconnects every segment 12 and enables the processors and memory located in different segments 12 to communicate with a uniform latency. In one embodiment of present invention, each crossbar switch has a 1 clock latency per tier, which includes reconfiguration time. For a sixteen segment 12 computer system 10 utilizing three hundred and twenty processors 16, 18 only two crossbar tiers are required. In addition to the crossbar switch interconnecting every segment and memory, the layered switches are chained via, in one embodiment, chain ports of the FPGA's, forming a toroidal switch to prevent interlayer blocking. Interlayer blocking occurs when a segment seeks simultaneous access to a particular shared resources via the same port. Typically the requests would be priorities and serialized according to an established conflict resolution scheme. By forming a toroidal switch and chaining the FPGAs together, lower priority requests can be rerouted to other FPGAs that can in turn provide access to the desired shared resource.

Figure 3:
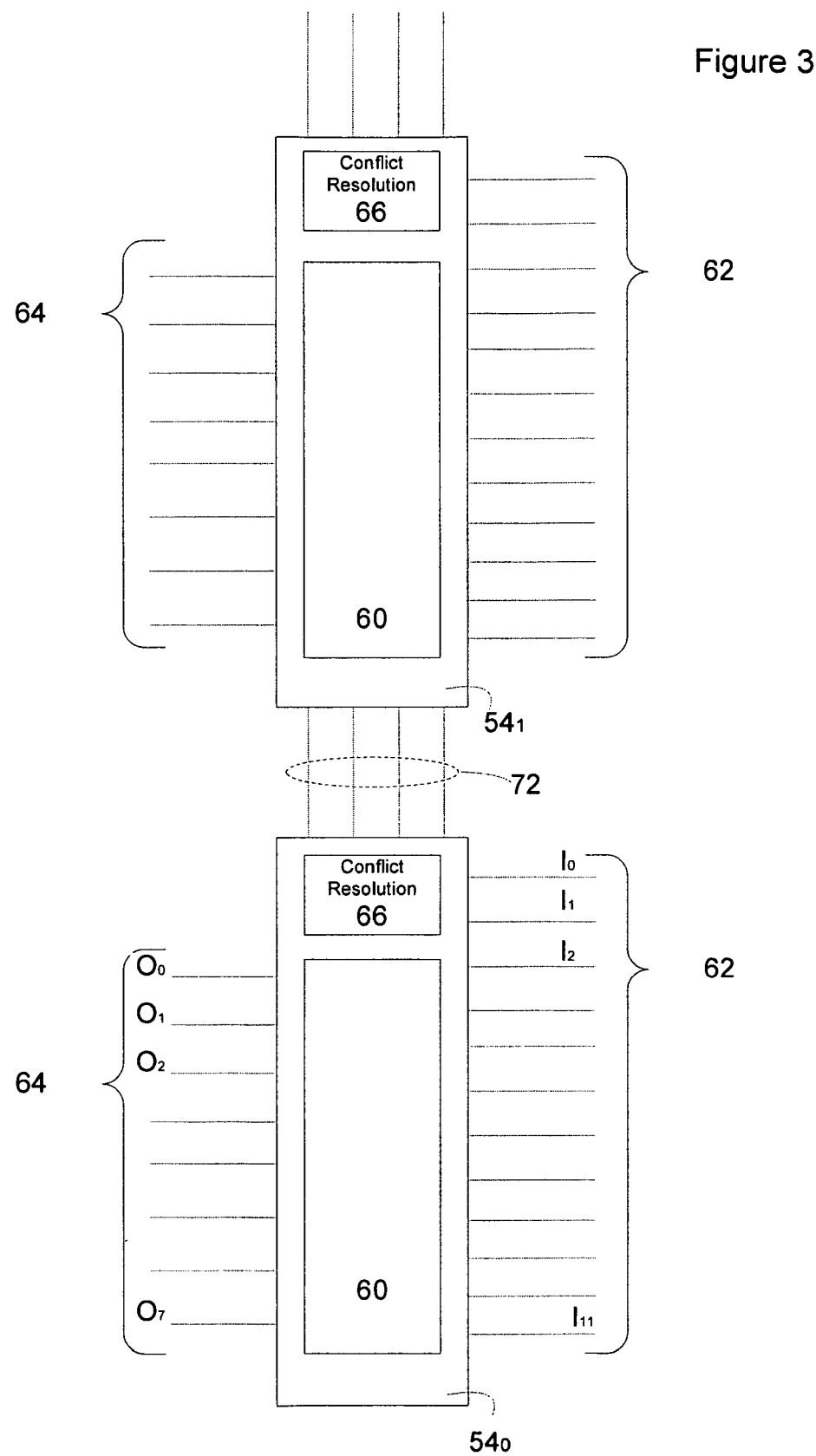
FIG. 3 is a simplified block diagram of a dynamic priority conflict resolution and data routing circuit utilized as processor switches in the interconnect strategy of FIG. 2 illustrating, for example, twelve input ports and eight output ports.

With reference additionally now to FIG. 3, a dynamic priority conflict resolution and data routing circuit utilized as the processor switches $54_0$ through $54_v$ in the interconnect strategy of the preceding figure is shown. In this exemplary illustration, a number of FPGA implemented data routing integrated circuit devices ("chips") 60 under the control of a number of conflict resolution chips 66 are utilized to interconnect 12 input ports 62 ($I_0$ through $I_{11}$) to eight output ports 64 ($O_0$ through $O_7$). FIG. 3 further illustrates chain ports 72 associated with each processor switch 54 enabling the switches to form a toroidal switch.

As will be more fully described hereinafter, the data routing chips 60 and conflict resolution chips 66 of the processor switches 54 function to afford equal priority access to the shared memory resources (memory banks $50_0$ through $50_t$) by all processing devices (the processors of each segment $12_0$ through $12_n$ of the computer system 10).

The function of the circuit shown is to dynamically resolve conflicts within the crossbar switch used to connect the processors 12 to the memory 50. The embodiment disclosed with particularity includes a switch 54 with a first plurality of input ports (e.g. 12) and a second plurality of output ports (e.g. 8). A number of these switches 54 are then cascaded into two levels to allow provide each processors 12 with access to any memory banks 50. As stated previously, in a computer system 10 utilizing this large number of processors 12, it is necessary to ensure that all processors 12 have equal priority to access memory over time.

In operation, with further reference to FIG. 4, a priority level for each input port is maintained by each output port 64. On power up, these priority levels are predetermined in accordance with the particular computer system design. According to one conflict resolution scheme, when a conflict for a particular output port occurs, the priority levels of the conflicting inputs are evaluated and access is initially granted to the highest priority input by a conflict resolution chip or module 82. Once this initial access is granted, the priority level of the "winning" input is then changed to the lowest priority level and the priority of all of the other inputs are each increased by one.

Through use of this technique, inputs will transition through all of the possible priority levels based upon their usage of the output and an input that has just been given access to the output will have a low priority, whereas an input that has not recently accessed the output will have a higher priority. Inasmuch as only inputs that require access to the output are evaluated, the system always allows a useful connection. In addition, the input that has least recently used the output will be allowed access to it.

Since it is possible that an input may not want to gain access to a particular output port for some time, this delay will result in its priority being incremented to the highest level and remaining there when two or more ports are active. In the particular implementation disclosed, this highest level priority is the only priority level that can legitimately be held by more than one input at a time. As a consequence, a priority tie resolver 86, as further described in detail herein, deals with a conflict between inputs that all have the highest priority level. This same situation might also be encountered in the event of a circuit error that inappropriately assigned the same priority to two inputs.

In operation, a priority level for each input port is maintained by each output port. On power up, these priority levels are predetermined in accordance with the particular computer system design. As previously disclosed, when a conflict for a particular output port occurs, the priority levels of the conflicting inputs are evaluated and access is initially granted to the highest priority input. Once this initial access is granted, the priority level of the "winning" input is then changed to the lowest priority level and the priority of all of the other inputs are each increased by one.

Since it is possible that an input may not want to get access to a particular output port for some time, this event will result in its priority being incremented to the highest level and remaining there. In the particular implementation disclosed, this highest level priority is the only priority level that can legitimately be held by more than one input at a time. As a consequence, a mechanism is disclosed herein to deal with a conflict between inputs that all have the highest priority level. This same situation might also be encountered in the event of a circuit error that inappropriately assigned the same priority to two inputs. In a situation where a conflict arises between inputs that all have a common highest priority level, an initial winner is selected based on previously established criteria. Accordingly to one embodiment of the present invention, fairness of subsequent tie situations is ensured by storing the winner of the tie. As disclosed, on power up, priority levels are predetermined in accordance with the particular computer system design. These priority levels additionally provide a predetermined priority tie precedence level which may or may not be equivalent to the elements predetermined priority level. During the first occurrence of a priority tie, the system refers to the tie precedence level to select a winner. Once selected, the port to be issued a win during such a tie is stored such that upon a subsequent tie between inputs having a common highest priority level, a previous winner is precluded from selection until each of the remaining highest priority level inputs is selected.

TABLE 1

| | | Conflict Tie Priority Balancing | | | |
|---|---|---|---|---|---|
| Event | A (3) | B (2) | C (1) | D (0) | Winner |
| 1 | 3 | 3 | 3 | 3 | A |
| | 0 | 3 | 3 | 3 | B |
| | | 0 | 3 | 3 | C |
| | | | 0 | 3 | D |
| | | | | 0 | |
| 2 | 3 | 3 | 3 | 3 | B |
| | 3 | 0 | 3 | 3 | A |
| | 0 | | 3 | 3 | C |
| | | | 0 | 3 | D |
| | | | | 0 | |
| 3 | 3 | 3 | 3 | 3 | C |
| | 3 | 3 | 0 | 3 | A |
| | 0 | 3 | | 3 | B |
| | | 0 | | 3 | D |
| | | | | 0 | |
| 4 | 3 | 3 | 3 | 3 | D |
| | 3 | 3 | 3 | 0 | A |
| | 0 | 3 | 3 | | B |
| | | 0 | 3 | | C |
| | | | 0 | | |
| 5 | 3 | 3 | 3 | 3 | A |
| | 0 | 3 | 3 | 3 | C |
| | | 3 | 0 | 3 | D |
| | | | 3 | 0 | B |
| | | | | 0 | |

A timing depiction of this scheme is presented in table 1. The table represents three input ports from three processor elements simultaneously seeking access to a single output port. In this example, each port possesses a single packet to be delivered and row in the table represents a particular instance in time. Each event occurs at a distinct instant in time. In the conflict resolution scheme depicted in table 1 the highest available priority is 3 and the initial predetermined priority levels of processor elements A, B, C, and D is 3, 2, 1, and 0 respectively. In a situation where a conflict occurs between processor elements A, B, C, and D each having the highest priority of 3, a priority comparison scheme will select processor element A as the winning priority based on processor A's winning predetermined priority of 3. As packets remain vying for the single port, the priority tie between processor elements B, C, an D will be successively resolved, again based on, at least initially, the predetermined priority. In this case the winners of the successive ties for this instance in time would be processor element B, C, and D respectively. The victor of each tie and the circumstances or configuration surrounding the event is stored. The result is that for the first instance of processor elements A, B, C, and D attempting to simultaneously access a single port at the same time, each having a priority of 3, access will be granted in the order of processor element A, B, C and then D.

Subsequent conflicts between the four processors in which all four processor elements A, B, C, and D seek access to the same port simultaneously and possess a priority tie will result in the remaining processors to selected as winners in a different order When the occurrence of another conflict occurs where the priority of processor elements A, B, C and D is tied at 3, an embodiment of the invention disclosed herein, having previously stored the identity and frequency of the previous winner of a tie involving participating processors, (as shown in Table 1 by being highlighted) prevents the selection of a previous winner until the remaining processing elements have been selected as a winner in similar circumstances. In this example processor element A is prevented from being selected as a winner of a tie between processor elements A, B, C, and D since it was previously won a similar conflict priority tie involving the same participants. Of the remaining three processing elements, processor element B possesses the highest predetermined precedent tie priority and is selected as the winner.

Continuing with the aforementioned example and referring to Table 1, consider a subsequent occurrence of a conflict with processor elements A, B, C, and D (event 2) also resulting in a highest priority (3) tie. As processor element A has already won a previous tie under identical circumstances between processor elements A, B, C, and D, it is prevented from winning this tie. The predetermined tie precedence levels of the remaining processor elements B, C, and D are again compared resulting in processor element B winning. B's victory is stored.

During the third occurrence (event 3) of a conflict tie between processor elements A, B, C, and D, processor element C is the winner as both processor element A and processor element B have already won. Likewise during event 4 processor elements A, B, and C having already won, D is selected. Note that the same storage of winning processor and comparison of circumstances is conducted on conflict ties that may result from the selection of a winner under this scheme. For example, subsequent to the first conflict tie resulting in processor element A being selected, processor elements B, C, and D are still in conflict and still remained tied with a priority level of 3. Their priority tie precedence comparison results in processor B being selected. The same conflict and priority tie occurs in the $5^{th}$ iteration, event 5. In this case, while the conflict tie between processor elements A, B, C, and D result once again in the selection of processor element A, the tie between processor elements B, C, and D results in the selection of processor element C. This is because processor element B's previous victory in a tie involving processor elements B, C, and D has been stored, preventing a subsequent selection of processor element B until processors C and D have equal selection statistics. By storing and preventing reoccurring selection based solely on a predetermined priority level, the fairness of input conflict resolution in situations experiencing a tie is prevented.

A case that demonstrates an occurrence of ties between inputs that all have the highest priority level is semaphore access patterns. Many processors may attempt to lock a semaphore while a few processes in the system are moving data normally between nodes. Generally the semaphores are retried and the interval of retry is determined by the latency around the loop to the semaphore register and back to the processor. This loop gives time for the normal data movement to increment the unused semaphore paths to highest priority and the semaphore paths will tend to default always to the same priority for such priority ties. This becomes more of a problem as the number of switch ports decrease because it takes less time for the priority counts to reach the maximum and become tied. Thus the problem is more apparent on a 4×4 switch than a 16×16 switch if loop latency is constant. The embodiment of the present invention described above solves this problem by providing fair access to inputs when two or more inputs share a common highest priority level.

Figure 5:
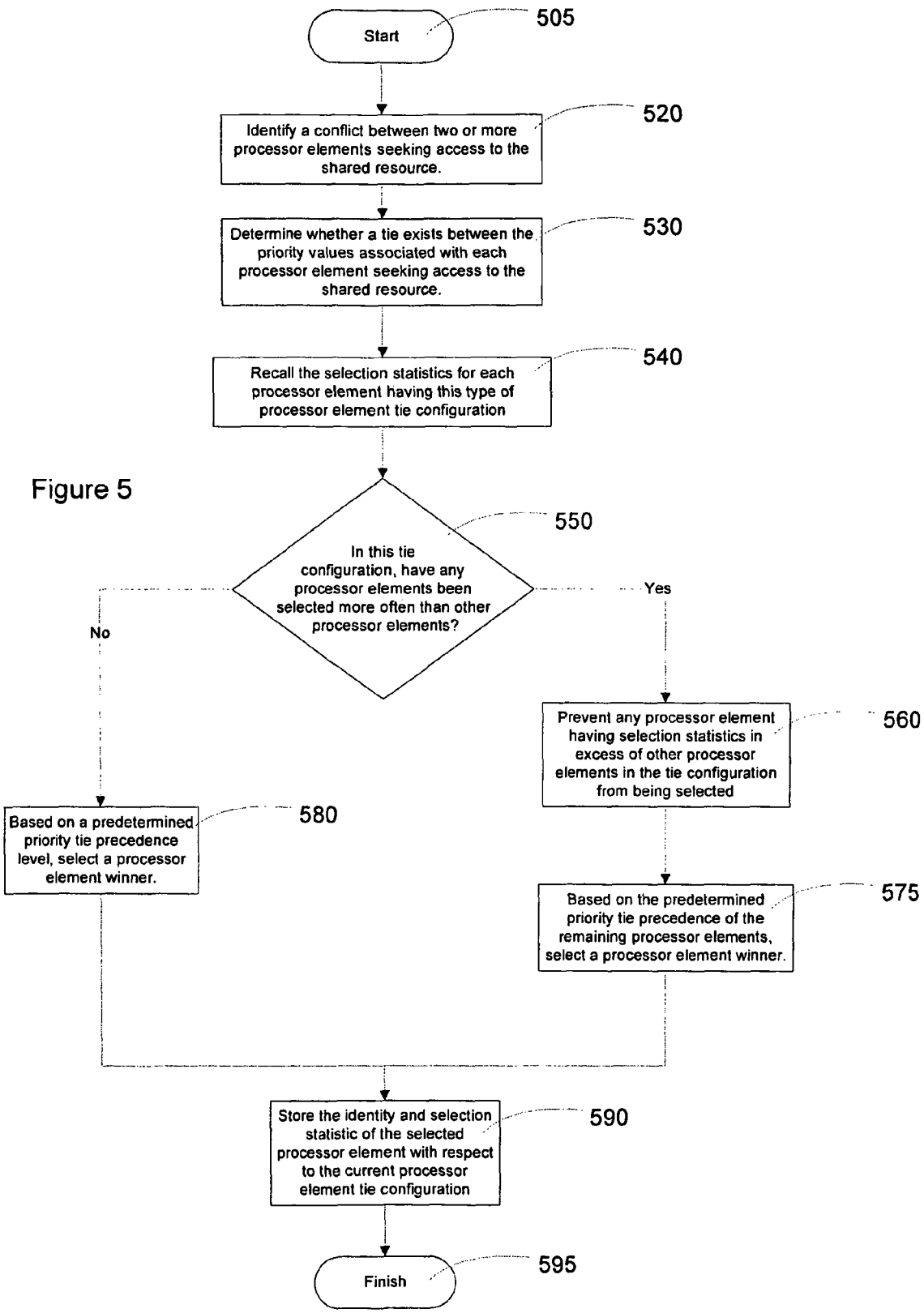
FIG. 5 is flow chart of one embodiment for a method of dynamic priority conflict resolution involving a priority tie consistent with the system of the present invention.

FIG. 5 depicts a flow chart of one exemplary method for dynamic conflict resolution for inputs having a common priority in a multi-processor computer system having shared resources according to the present invention. The process begin with the identification 520 of a conflict. One or more processor elements seeks to simultaneously access a shared resources. As disclosed herein shared resources are typically shared memory resources but can also be peripheral components such as input/output devices that are shared by the bank of processing elements. Once it has been identified 520 that two or more processing elements seeks access to the same shared resources a dynamic conflict resolution scheme generally resolves the conflict based on the priorities associated with each processor element. However in this case it is determined 530 that a priority tie exists between the processor elements seeking access to the shared resource.

With the existence of a priority tie determined 530, selection statistics for each processor element with the existing processor element tie configuration is recalled 540. For example a priority tie between processor elements A, B, C, and D establishes a tie configuration. Each element of the configuration has a selection statistic associated with that configuration. Once the selection statistic of each participating processor element of that particular tie configuration has been recalled, the statistic are compared 550 to determine if any of the participating processor elements has been selected more often than any of the other participating processor element. When it is determined that all of the participating processor elements have equivalent selection statistics, a processor element is selected 580 based a predetermined priority tie precedence level or by another means as would be know of reasonable skill in the art. Upon selection, the identity and selection statistic of the selected processor is stored 590 with respect to present priority tie configuration.

When it is determined 550 that one or more of the processor elements has been selected more often than another processor element participating in the tie, the selection criteria is modified. Processor elements that have been previously selected in a similar tie configurations, and accordingly possess a higher selection statistic as compared to the other participating processor elements, are prevented 570 from being selected. Continuing with the previous example, a comparison of the selection statistic of processor elements A, B, C, and D may reveal that in the same tie configuration, processor A was selected since processor A possessed a higher predetermined priority tie precedence level. This revelation would result in processor element A being precluded from being selected regardless of its predetermine tie precedence level. The remaining processor elements, assuming they all have equal selection statistics, would be evaluated to determine 575 which processor element would win the tie. Again the winning processor element's identity and selection statistic would be stored 590 with respect to the present priority tie configuration.

In another embodiment of the present invention the priority of a single active port remains unchanged subsequent to a conflict. As shown in FIG. 4, an additional functionality of the conflict resolution chip 82 is the management the occurrence of a single active port 92. When the case occurs that only one input port is active, the priority of each processor elements is constrained to remain the same. This will cause an input port to be able to access an output for at least two packets in a row, but will ensure that inputs are dealt with in a more fair manner. Since all input ports get this two access advantage, the fairness is quickly equalized. This prevents all unused input ports being incremented to the highest priority when one input port is running. For example, under a typical priority scheme the priority of each non-selected port is incrementally increased whether it has a packet vying for a port or not. A single active port having several packets will drive the remaining processor elements to their highest priority level where they will remain. Upon a subsequent conflict, a priority tie will result resulting a tie resolution that over several occurrences is typically unfair. Alternatively when each port has a single packet or an equal number of packets the priority scheme will repeat giving unfair semaphore access to the first winning port. The present embodiment resolves this type of egregious inequality.

A tabular depiction of this embodiment of the present invention is depicted in Table 2. Table 2 represent three processor elements A, B, and C that are seeking to access the same output port for a shared resource. Processor elements A, B and C have a predetermined priority value of (3), (2) and (1) as determined upon power up and have an actual priority level of 3, 2, and 1 respectively. Each event depicted in table 2 is a separate occurrence in time. In the example presented the three processor elements are in conflict in that they are each trying to access the same resource at the same time. Each processor element has a single packet to deliver as indicated by the • following the priority number.

TABLE 2

Single Port Conflict Priority Balancing

| Event | A (3) | B (2) | C (1) | Winner |
|---|---|---|---|---|
| 1 | 3• | 2• | 1• | A |
|  | 0 | 3• | 2• | B |
|  | 1 | 0 | 3• | C |
| 2 | 1• | 0• | 3• | C |
|  | 2• | 1• | 0 | A |
|  | 0 | 2• | 1 | B |
| 3 | 0• | 2• | 1• | B |
|  | 1• | 0 | 2• | C |
|  | 2• | 1 | 0 | A |
| 4 | 2• | 1• | 0• | A |
|  | 0 | 2• | 1• | B |
|  | 1 | 0 | 2• | C |
| 5 | 1• | 0• | 2• | C |

At event 1 a conflict is recognized between processor elements A, B, and C. Each processor element simultaneously seeks access to a shared resource with a single packet. At the time the conflict occurs processor priority values for processor elements A, B, and C are 3, 2 and 1 respectively. Accordingly, processor element A is selected to gain initial access to the output port/shared resource. Priority values of the non-selected ports are incrementally increased and the priority value of A, the selected port, is reset to 0. Two remaining input ports, B and C, remain seeking access to the shared resource as they still possess a packet to deliver. A priority comparison of processor elements B and C results in processor element B's selection. As before the priority values of the non-selected processor elements are incrementally increased and the value of the selected processor element is reset to zero. The resulting priorities for processor elements A, B, and C are 1, 0, and 3 respectively.

At this point only one input port, the one associated with processor element C, remains active as it is the only port possessing a packet. A conflict does not exist however typically conflict resolution schemes, as are known to one skilled in the relevant art, would select element C, reset element C's priority to zero and incrementally increase the non-selected processors. As previously discussed this produces inequitable selection statistics. According to one embodiment of the present invention and as described in this disclosure, the selection of a port that is a singularly active results in the priority levels of all processors to remain the same. Since in this example only one port, processor C, is active, the priority value of processor elements A, B, and C remains unchanged. This results in the priority values of processor elements A, B, and C being 1, 0, and 3 respectively.

A subsequent conflict and comparison of priority values results in processor C being selected again. As more than one port is active (processor element A, B, and C each possess packets seeking access to the shared resource), processor C's priority value is reset to zero and the priority value of the non-selected ports, A and B, are incrementally increased. The process continues as depicted in Table 2. The result is a fair selection process in situations of processor elements seeking access to a shared resource such as a semaphore.

To further illustrate this embodiment of the present invention, take the simple case where four input ports are active at once, but only for one packet. The highest priority input is sent first and priority is lowered while all others are incremented. As the process is repeated for the four packets, using the previous scheme, notice that priorities end in the same state they began. This is not fair for semaphore access, since the first semaphore through will gain lock. The others will be retried and when the first is finished using the semaphore register it can issue a semaphore access again and beat the other three channels. It has been shown in testing that this case does occur and results in a very unfair access pattern with the first port gaining lock of the semaphore a high percentage of the time (see the description herein of semaphore traffic). Recall that for any case where more than one input port is active the priority resets and increments happen as described herein. In this embodiment of the present invention, in the case of one port being active, the priority of the single port retains its current value. This allows heavy traffic to alternate fairly and light semaphore type traffic to be cycled through priority levels to prevent one channel from abusing the simpler original scheme.

Figure 6:
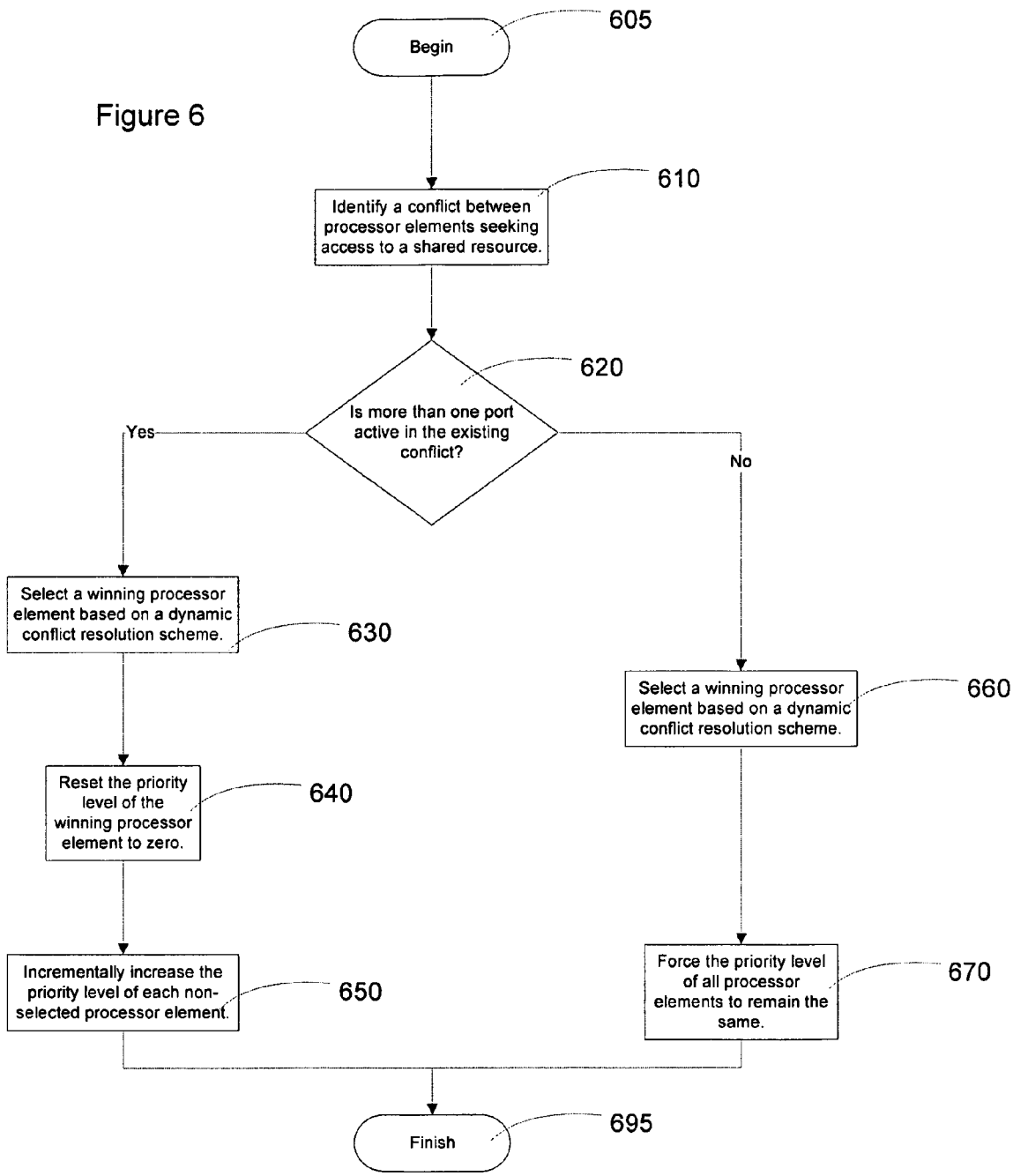
FIG. 6 is a flow chart of one embodiment for a method of dynamic priority conflict resolution having a single active port consistent with the system of the present invention.

FIG. 6 provides a flow chart of one embodiment for a method for dynamic conflict resolution for inputs in a multi-processor computer system having shared resources. The exemplary method shown in Figure V begins with the identification 610 of a conflict between processor elements seeking access to a shared recourse. For example one or more processors may seek to access a shared memory resources, each processor wishing to convey one or more packets of information to the resource. When two or more ports, each one representing a request from a processor, are active 620, meaning that the port possesses a packet seeking to be delivered to the shared resource, a conflict resolution must occur. As disclosed herein, conflict resolution between processor elements seeking the same resource is accomplished 630, in one embodiment, by a dynamic conflict resolution scheme.

Typically a priority level associated with each processor element determines which input port will first gain access to the shared resources. Once a port has been selected and access to the shared resource granted, the priority level associated with that processor element is reset 640 to zero. The priority level of ports, a.k.a. processor elements, not selected is incrementally increased 650.

Accordingly to this embodiment of the present invention, when only one port is active the priority level of the selected port is not reset as is typically accomplished. When it is determined 620 that only one port is active, a conflict between processor elements is resolved resulting in the selection 660 of a single processor. Rather than resetting the selected processor's priority level to zero, the priority level of all of the elements is forced 670 to remain the same. The resulting selection pattern is a fairer access pattern since all ports get a two access advantage While there have been described above the principles of the present invention in conjunction with specific a specific multi-processor computer architecture it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

I claim:

1. A computer system including a plurality of processing elements requiring access to a shared resource, said computer system comprising:
   a priority conflict resolution circuit comparator for dynamically resolving a priority tie among a plurality of processing elements simultaneously requesting access to said shared resource, the priority tie resulting from more than one of said plurality of processing elements to be of a common highest priority, said priority conflict resolution circuit comparator including an initial predetermined differing priority tie precedence assigned corresponding to each of said plurality of said processing elements wherein upon a selected one of said plurality of processing elements being afforded access to said shared resource based upon said initial priority tie precedence thereof being a highest priority of said plurality of processing elements and wherein an identity of the selected one of said plurality of said processors is stored so as upon a subsequent priority tie of said plurality of processing elements the selected one of said plurality of said processors is prevented from being selected again until each remaining processing element of the plurality of processing elements is selected.

2. The computer system of claim 1 wherein said priority conflict resolution circuit comparator dynamically corrects erroneous priorities among said plurality of processing elements.

3. The computer system of claim 1 wherein said priority conflict resolution circuit comparator resets after each of said plurality of processing elements is selected subsequent to the priority tie.

4. The computer system of claim 1 wherein said predetermined differing priority tie precedence assigned corresponding to each processing element of said plurality of processing elements is maintained by an output port of a dynamic priority conflict resolution circuit.

5. The computer system of claim 1 wherein said initial predetermined differing priority tie precedence and a predetermined processor element priority level are the same.

6. The computer system of claim 5 wherein said initial predetermined differing priority tie precedence and said predetermined processor element priority level are determined at computer start up.

7. The computer system of claim 1 wherein said shared resource is a semaphore.

8. A method for dynamically resolving a priority conflict tie in a computer system including a plurality of processing elements and a shared resource, the priority conflict tie resulting from more than one of said plurality of processing elements to be of a common highest priority, said method comprising the steps of:
   assigning a predetermined differing initial priority tie precedence corresponding to each of said plurality of processing elements;
   affording access to said shared resource to a requesting one of said plurality of processing elements having a highest initial priority tie precedence thereof;
   storing an identity of the requesting one of said plurality of processing elements afforded access to said shared resource; and
   upon a subsequent priority conflict tie among the plurality of processing elements, preventing processing elements previously afforded access to said shared resource from affording access to said shared resource until each of said plurality of processing elements is afforded access to said shared resource.

9. The method of claim 8 wherein said steps of affording access, storing and preventing are carried out by a priority conflict resolution circuit comparator.

10. The method of claim 8 further comprising the steps of:
    comparing priorities among said plurality of processing elements; and
    dynamically correcting erroneous priorities among said plurality of processing elements.

11. The method of claim 8 further comprising the step of:
    maintaining said initial priority tie precedence assigned corresponding to each of said plurality of said processing elements at a respective output port of said priority conflict resolution circuit.

12. The method of claim 8 wherein said shared resource is a semaphore.

13. A computer system including a plurality of processing elements and a shared resource, said computer system comprising:
   a dynamic conflict resolution circuit for controlling access to said shared resource among said processing elements, said dynamic conflict resolution circuit including a conflict priority scheme for resolving two or more simultaneous processing element requests to access said memory resources wherein, responsive to request activity being isolated to a single active port, said conflict priority scheme maintaining current processing element priority level of each processor element for at least one processing cycle.

14. The computer system of claim 13 wherein said processing elements request access to a semaphore.

15. The computer system of claim 13 wherein responsive to request activity being isolated to said single port, said dynamic conflict resolution circuit inhibiting processor element priority level alterations subsequent to shared resource access being granted.

16. A method for dynamic conflict resolution a computer system having a plurality of processing elements and a shared resource, said method comprising the steps of:
   implementing a conflict resolution scheme to arbitrate simultaneous access requests from said plurality of processing elements to said shared resource; and
   responsive to a single port being active, inhibiting processor element priority level alterations of said plurality of processing elements subsequent to shared resource access being granted.

17. The method of claim 16 wherein said plurality of processing elements request access to a semaphore.

* * * * *